June 14, 1938.  N. C. SCHELLENGER  2,120,651
VARIABLE RESISTANCE DEVICE
Filed June 11, 1934  2 Sheets-Sheet 2
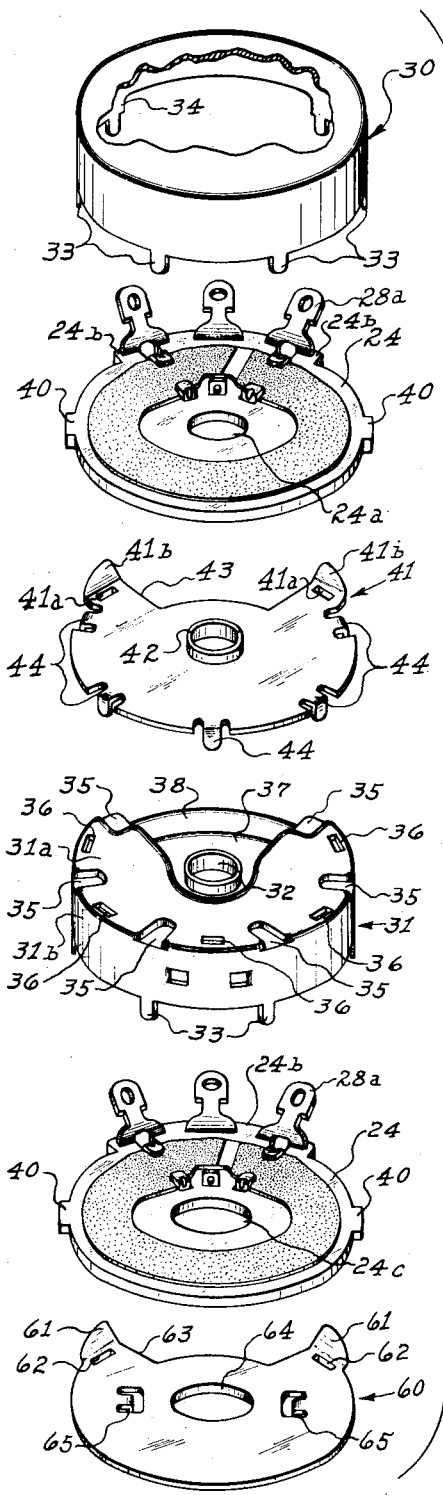
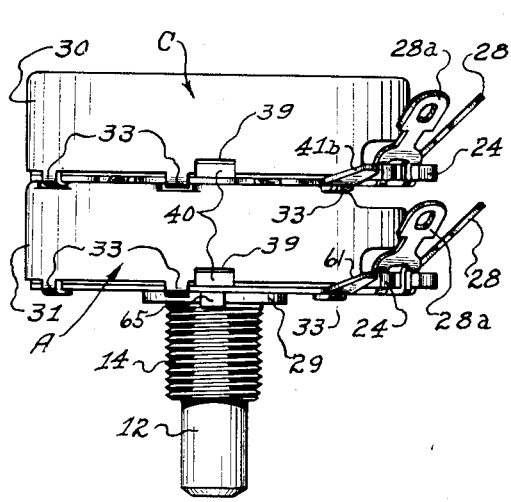
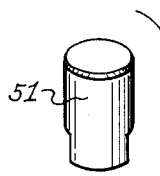
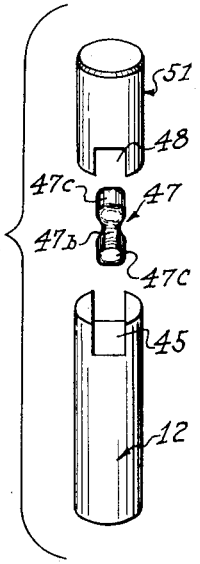
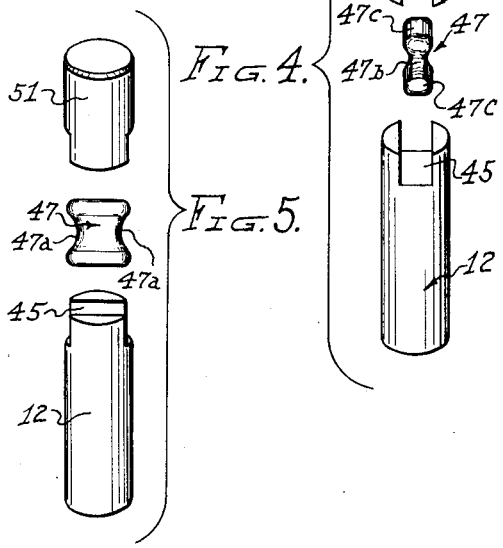
INVENTOR.
NEWTON C. SCHELLENGER.
BY Louis A. Wieber
ATTY.

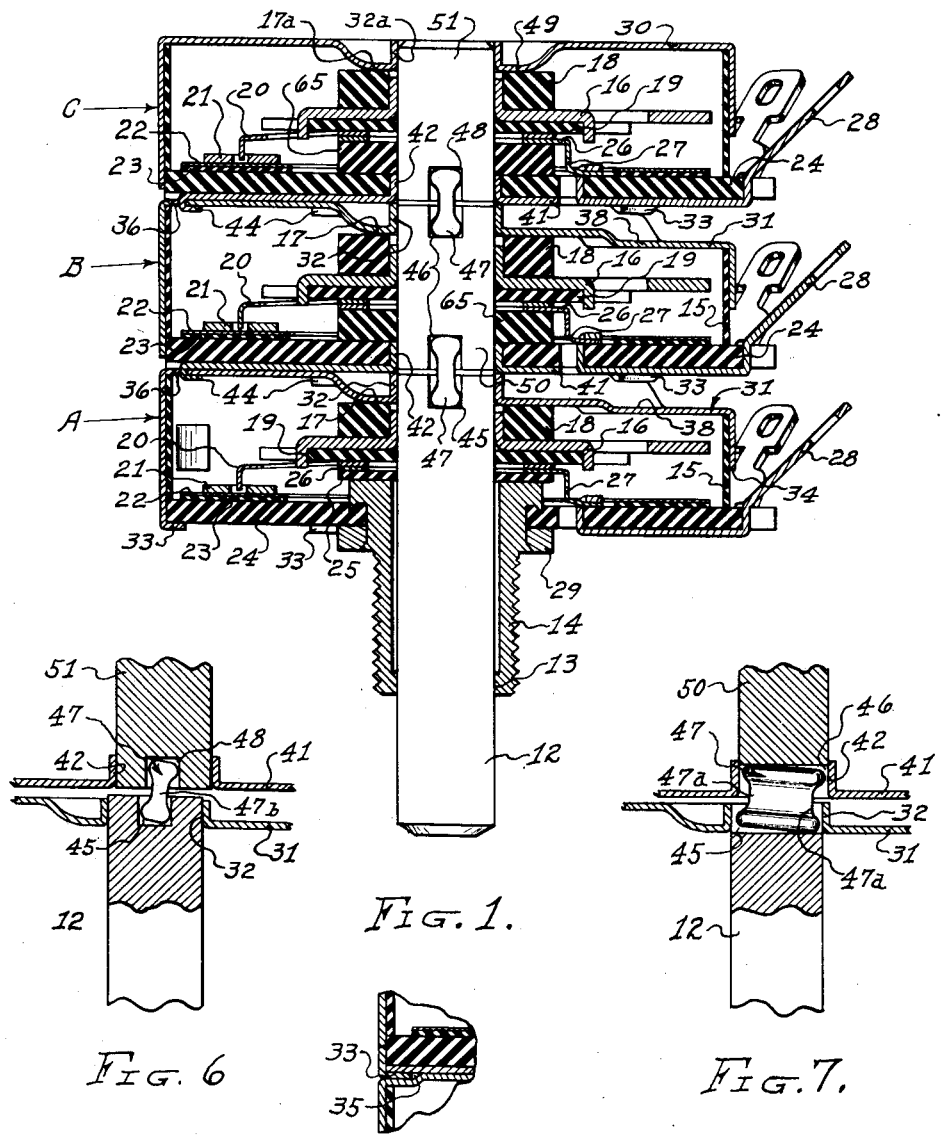

Patented June 14, 1938

2,120,651

UNITED STATES PATENT OFFICE 2,120,651

VARIABLE RESISTANCE DEVICE

Newton C. Schellenger, Elkhart, Ind., assignor to Chicago Telephone Supply Co., Elkhart, Ind., a corporation of Indiana Application June 11, 1934, Serial No. 730,039

5 Claims. (Cl. 201—48)

This invention relates to variable resistance devices and more particularly to a plurality of variable resistance units connected in a positively secured tandem relationship to constitute a single device for operation by a single actuating means and including a novel structure for coupling a series of alined shafts.

In variable resistance devices connected in tandem relationship as known heretofore, great difficulty has been experienced in connecting the various units in a positively secured tandem relationship and at the same time insuring a smooth free rotation of the alined shafts of the several units without any tendency toward binding thereof.

In the manufacture of variable resistance devices aranged in tandem relationship in mass production by the use of comparatively light grade materials and with low cost operations such as by punch press and forming press operations, very fine tolerances between individual units cannot be adhered to. On the other hand, the various individual units to be connected in tandem must be very securely and rigidly fixed to each other to prevent any movement of the said units relative to each other. The actuating shafts of the individual units will consequently often be slightly out of alinement with each other, and upon coupling the various mis-aligned shafts for operation by a single actuating member, a binding action of one or more of the shafts in their respective bearings will necessarily result.

I have found that a plurality of variable resistance units can be constructed of light materials with low cost operations, that the various elements of these units can be assembled in accurately positioned relationship to each other with maximum allowable tolerances and without lowering the precision of operation thereof, that they can be rigidly and fixedly secured to each other with maximum allowable tolerances of the co-operating securing means and alinement of operating shafts and yet insure a free smooth operation of all shafts in their respective bearings despite considerable mis-alinement of the shafts.

It is therefore, an object of my invention to provide a variable resistance unit in which the various elements thereof are properly shielded and insulated and in which the said elements may be easily and rapidly assembled in a securely fixed relationship to each other.

It is another object of my invention to provide a plurality of variable resistance units connected rigidly and securely to each other to form a tandem device and with the operating shafts thereof coupled to each otner for smooth free rotation despite considerable misalinement between said shafts.

It is another object of my invention to provide a plurality of variable resistance units connected rigidly and securely to each other to form a tandem device, and each variable resistance unit having means for electrostatically shielding the same from an adjacent unit, said shielding means also being adapted to secure said units to each other.

It is still another object of my invention to provide a plurality of variable resistance units connected rigidly and securely to each other to form a compact tandem device, each variable resistance unit having means for electrostatically shielding the same from an adjacent unit, said shielding means between adjacent units being offset to increase the compactness and rigidity of the tandem device and to prevent undesirable electrical contact between elements thereof.

It is a further object of my invention to provide a novel coupling means between adjacent shafts of a plurality of variable resistance units connected securely to each other to form a tandem device.

It is a still further object of my invention to provide a plurality of variable resistance units constructed of light material by low cost manufacturing operations and having means for rigidly and securely connecting the same to each other to form a tandem device, said units having operating shafts coupled to each other for smooth free rotation in their respective bearings.

Still further objects and advantages of this invention will become evident by reference to the following detailed description taken in connection with the accompanying illustrations of one specific embodiment thereof.

In the drawings, which for purposes of clarity, illustrate the invention on a considerably larger scale than the actual size of the device, Fig. 1 is a vertical sectional view of three variable resistance units secured in tandem relationship;

Fig. 2 is a side elevational view of two variable resistance units secured in tandem relationship;

Fig. 3 is an exploded perspective view of two variable resistance units composing a tandem device, with the actuating mechanism removed therefrom;

Fig. 4 is an exploded perspective view of the shafts and coupling means for a tandem device composed of two variable resistance units;

Fig. 5 is an exploded perspective view of the shafts and coupling means shown in Fig. 4, but taken from another angle;

Figs. 6 and 7 are fragmentary sectional views of a pair of mis-alined shafts and coupling means positioned therein;

Fig. 8 is a vertical section view showing a cover ear and a corresponding offset portion.

Referring to the embodiment of the invention illustrated in the drawings, A, B, and C designate generally three variable resistance units adapted to be connected in tandem as clearly shown in Fig. 1.

The variable resistance unit A comprises an actuating shaft 12 journalled in the bearing 13 of a bushing 14 and the bearing 32 of a metallic housing 31. The bushing 14 is securely fixed to an insulating base plate 24 and a washer 29. A metallic drive arm 16 is fixedly mounted on the shaft 12 adjacent the end of the said shaft which is journalled in bearing 32. A thrust bearing 17 is formed in the housing adjacent journal bearing 32, and a thrust washer 18 is positioned between thrust bearing 17 and the fixedly secured drive arm 16 to take the end thrust of the shaft. The drive arm 16 is rotatably coupled with a contact arm 20 through the intermediary of an insulating plate 19. The base plate 24 is provided with an arcuate resistance element 22 which may be a coating of carbonaceous resistance material applied directly on the base plate 24 or applied to a separate piece of insulating material 23 which in turn is fastened to base plate 24. A contactor 21 is positioned on the resistance element 22 for sliding or wiping engagement therewith. The contactor 21 is connected to the contact arm 20 for actuation thereby. The contact arm 20 is made of a resilient highly conductive material and is provided with a warped or bowed portion for maintaining an electrical contact with a collector ring 26. The collector ring is formed with an extension arm 27 which is firmly connected to the center terminal 28 which terminal is not directly in contact with the resistance element. The other two terminals are connected to the ends of the arcuate resistance element 22 and thus causing the current to flow through the unit in the following manner: from one of the end terminals 28a to the resistance element 22, to the contactor 21, to the contact arm 20, to the collector ring 26, to the extension 27, to the center terminal 28. For a more detailed disclosure of this particular variable resistance unit mechanism and the construction and relationship of its various parts, reference is made to my co-pending application Serial No. 721,728, filed April 21, 1934.

The metallic housing 31 (Fig. 3), above referred to consists of a cup-shaped metallic member having an end wall 31a and a circular side wall 31b. The circular side wall 31b is formed with a notched section 34 to provide clearance for the terminals 28 and 28a, and with two oppositely disposed notched sections 39, 39 (Fig. 2) for cooperation with a pair of spacing and locating lugs 40, 40. A plurality of spaced ears 33 extend from the free end of the side wall 31b for cooperation with the bottom surface of the base plate 24 to secure said plate 24 in the housing.

The end wall 31a is formed with a shallow off-set portion 37 surrounding the journal bearing 32, for the purpose of providing a thrust bearing 17 for the washer 18. A comparatively deep off-set portion 38 is provided at the peripheral margin of the end wall 31a as a continuation of the shallow off-set portion 37. The off-set portion 38 is formed to provide a clearance for the terminals of the next adjacent variable resistance unit B of the tandem unit shown in Fig. 1. A plurality of off-set portions 35 are formed at spaced intervals on the marginal periphery of the end wall 31a to provide clearance for the bent-over ears 33 of the next adjacent variable resistance unit B. The end wall 31a is also provided with a plurality of spaced slots 36 for a purpose as will be hereinafter described.

The housing 31 is spaced from the base plate 24 by means of the strip 15 of insulating material which is positioned against the inner surface of the side wall 31b and acts as a spacer between the inner surface of the end wall 31a and the base plate. This strip is provided with notched portions as clearance for the off-set portions 35 and 38.

The variable resistance unit B is similar in construction to the unit A, with the exception that it is provided with a metallic grounding plate 41 closely adjacent the external surface of the base plate 24, and the ears 33 of unit B are bent over against the grounding plate 41 instead of the base plate 24. The grounding plate 41 is provided with a plurality of ears 44 struck therefrom and which are of a size and location corresponding to the slots 36 in the end wall 31a. The grounding plate is provided with a centrally located upstanding collar 42 which is adapted to function as a journal bearing for a shaft 50 of the device B. A radially notched portion 43 is formed in the grounding plate 41 as clearance for the terminals of the corresponding variable resistance unit. Grounding plate 41 is positioned accurately on the insulating base 24 with respect to angular movement by the ears 41b on the periphery of the plate, adjacent each side of the notch 43, projecting up alongside the terminal supporting lobe 24b on base 24. Each of the rectangular slots 41a are positioned to receive one of the cover ears 33 so that all of these ears may be of uniform shape and can be formed over against the ground plate in a uniform manner. These slots cooperating with the ears 33 also serve to more accurately and positively position the cover on the base. Unit B is constructed with a short stub shaft 50 instead of a projecting actuating shaft as shown in unit A. The stub shaft is journalled in collar 42 at one end thereof and in journal bearing 32 of housing 31 at the other end thereof, thus eliminating the bushing 14. Due to elimination of the said shaft bushing, the insulation washer 65 of unit B is made considerably thicker than insulating washer 25 of unit A.

Variable resistance device C is also provided with a grounding plate 41 as shown and described in variable resistance unit B, and also has a stub shaft 51 instead of a projecting actuating shaft. Unit C differs from the other two units in that the housing 30 thereof is not formed with the off-set portions 35, 37, and 38, but has an annular, off-set, flat-bottomed groove 49 to provide a thrust bearing 17a and a journal bearing 32a for shaft 51.

A longitudinally extending slot or groove 45 is cut, or otherwise formed, through the end of shaft 12 which is journalled in journal bearing 32. Stub shaft 50 has a similar slot 46 formed in each end thereof, and stub shaft 51 also has a similar slot 48 formed therein at the end journalled in collar 42 of the grounding plate. The slots of adjacent ends of the various shafts are arranged in alinement with each other and a coupling element 47 positioned in each cooperative pair of slots.

The coupling element 47 comprises a slightly elongated metallic body member of a somewhat dumb-bell shaped cross-section, the ends 47a of which are concave as is clearly shown in Fig. 5. The coupling member 47 is formed with enlarged top and bottom portions 47c and an intermediate reduced section 47b. The enlarged top and bottom portions are preferably constructed with a somewhat elliptical or arcuate, cross-sectional contour of a diameter or width substantially equal to the width of the cooperating slots 48 and 45 as illustrated in Fig. 4. When assembled, the coupling member 47 has one of its enlarged ends 47c positioned within slot 48 and the other enlarged end 47c within slot 45. The fit between the enlarged ends and their respective slots is sufficiently close that there will be but very slight rotational play or looseness between shafts.

In assembling the variable resistance units to each other, the following procedure is preferably observed:

The upper variable resistance unit C is first completely assembled as shown in Fig. 1 but with the struck out ears 44 extending downwardly. The housing 31, including insulation strip 15, of unit B is then positioned with the end wall thereof flatly against the grounding plate 41 of unit C and with the terminals 28, 28a and bent over ears 33 in register respectively with off-set portions 38 and 35. The struck out ears 44 of the grounding plate 41 will simultaneously register with slots 36 in the end wall of housing 31. These ears 44 are now bent over to secure the unit C rigidly with housing 31. The stub shaft 50, assembled with its grounding plate 41, base plate 24, insulating washer 65, collector ring 26, contact arm 20, contactor 21, insulating plate 19, drive arm 16 and thrust washer 18, is provided with a coupling member 47 in the upper slot 46 thereof and is positioned within journal bearing 32 of housing 31. The upper end of coupling member 47 is simultaneously brought into register with slot 48 of the shaft of unit C and the base plate 24 is brought to bear against insulating strip 15 and with lugs 40 of the base plate registering with notches 39 of the housing 30. Then the ears 33 of housing 31 are bent over against the grounding plate 41 of unit B. Fig. 8 shows the manner in which the cover ear 33 fits into the off-set portion 35 to permit the units to be flatly positioned together. The lugs 40 and notches 39 serve the dual purpose of locating elements and prevent shifting of the base plate 24 relative to housing 31 due to the provision therein of the wide terminal-clearing notch 34.

As many additional "B" units as desired may be assembled to the tandem device in the same manner as outlined above. The "B" units are all identical to each other but differ from the "C" unit in that the end wall of the housing is off-set to clear the terminals of the unit overlying the same and also to provide clearance for the bent over ears of the next adjacent housing. The "B" units differ from the "A" units in that no bushing or projecting shaft is provided therein, and it is furthermore provided with a grounding plate whereas usually none is needed in the "A" units.

However, in some cases when it is desirable to more completely shield unit A, or provide positioning ears, a grounding plate 60 may be provided (Figs. 2 and 3). When used, ground plate 60 is assembled between washer 29 and base 24 with bushing 14 extending through hole 64 and with ears 61 alongside the edges of lobe 24b. Locating ears 65 may be formed from the body of the plate to cooperate with holes in the surface on which the control is to be mounted and so prevent rotation of the control relative to its mounting surface. Ears 61 engage the sides of the terminal supporting lobe 24b to maintain the base and grounding plate in fixed angular relationship. There are also slots 62 in these ears to receive two of the cover ears. As described above, these slots 62 and ears 61 on the grounding plate and ears 33 on the cover serve to maintain the cover, grounding plate and base all in proper angular relationship and if any great rotational torque is applied to the cover or to the terminals 28 and 28a, when the control is mounted on a panel or support with the locating ears 65 engaging holes in the support, no shifting of the parts relative to each other will be possible. A shift of the ground plate could occur in other similar devices or might occur here if ears 61 were not in engagement with lobe 24b and as a consequence of this shift one of the terminals of the resistance element might be grounded accidentally with disastrous results.

The variable resistance unit A is then assembled and connected to the bottom of unit B in the same manner as units B and C were connected to each other except that the ears 33 of unit B are bent over against base plate 24, if no grounding plate is used in the bottom unit.

It will now be noted that due to the provision of off-set portions 38 and 35 the end wall of the housing of one unit may be positioned flatly against the surface of the grounding plate of the next adjacent unit, thereby greatly increasing the rigidity of the assembled device and the compactness thereof, and permits integrally formed portions of the grounding plate and end wall of the adjacent housing to be used as means for securing the units to each other in a most expedient and economical manner.

It will be quite apparent that the above described manner of constructing and connecting the variable resistance units to each other will often result in mis-alinement of the shafts of adjacent variable resistance units. Figs. 6 and 7 illustrate in a somewhat exaggerated manner the adaptability of the novel coupling means to shafts which are not in alinement with each other. The reduced portion 47b of the coupling member 47 prevents contact of the latter with the corners of the slots, and even though the member 47 is positioned at an angle to the respective shafts, a free, smooth drive therebetween is obtained. As will be noted in Fig. 7, the coupling members are provided with concave ends 47a to prevent contact with the journal bearing sections of the housing 31 or grounding plate 41. It is therefore obvious that a universal coupling effect is obtained between cooperating shafts, and a plurality of variable resistance units may be smoothly operated by a single actuating means despite material mis-alinement of shafts and rigid connections between the units. Nevertheless, the rotational play between shafts is very slight and practically immaterial.

It is obvious that the specific embodiment of the invention illustrated and specifically described may be varied in many details of its construction within wide limits without departing from the spirit of the invention, and it is to be understood that the invention is to be limited only within the terms of the appended claims.

I claim:

1. In a tandem variable resistance device, a plurality of variable resistance units fastened to each other, each of said variable resistance units having a cup-shaped metallic housing, notches in the side walls of said housings, base plates having lugs extending from the peripheral edge thereof and positioned in the open faces of said housings with said lugs arranged in said notches, metallic grounding plates overlying some of said base plates, substantially alined journal bearings formed within the contour of the housings from the end walls of said housings and the corresponding grounding plates, and individual shafts mounted in said substantially alined journal bearings, said shafts coupled to each other for simultaneous actuation thereof.

2. In a variable resistance device in combination, a plurality of variable resistance units connected in tandem relationship, a cup-shaped housing for each of said units, an actuating shaft projecting from one of said units and stub shafts in the remainder of said units, a metallic grounding plate positioned in the open end of the housings of said stub shaft units, said shafts being within the contour of the units and supported at opposite ends on the shell and grounding plate, ears on said housing bent over into engagement with said grounding plates, off-set portions in the end wall of said housings to provide clearance for the said ears of the next adjacent housing, cooperating means on said grounding plates and next adjacent housing end walls for securing said units to each other, and means for coupling said shafts for simultaneous operation thereof.

3. In a variable resistance device in combination, a plurality of variable resistance units connected with the bottom surface of one unit against the top surface of the next adjacent unit, metallic housings surrounding said units, projecting portions on the bottoms of said units, off-set portions in the top surface of the next adjacent unit interlocking with said projecting portions, individual shafts for said units, said shafts being within the contour of the units and supported at opposite ends on the end walls of the units, and means for coupling said shafts for simultaneous operation thereof.

4. In a variable resistance device in combination, a plurality of variable resistance units connected in tandem relationship, cup-shaped metallic housings surrounding said units, base plates covering the open ends of said housings, terminals secured to said base plates, a portion of the end wall of the cup-shaped housings adjacent to and overlying said terminals being off-set to provide clearance for the latter, individual shafts in said units within the contour of the units, and means for coupling said shafts for simultaneous operation thereof.

5. In a variable resistance device in combination, a plurality of variable resistance units, a cup-shaped metallic housing surrounding each variable resistance unit, metallic members closing the open end of said housings, ears struck from said metallic members, the end walls of said housings having apertures therein, said ears cooperating with said apertures to secure said units to each other, alined shafts journalled between said metallic members and their corresponding housing end walls and within the contour of said units, notches in the ends of adjacent shafts, and a universal coupling member positioned in the notches of each adjacent pair of shaft ends.

NEWTON C. SCHELLENGER.